(12) United States Patent
Yagi et al.

(10) Patent No.: US 6,387,843 B1
(45) Date of Patent: May 14, 2002

(54) METHOD OF PREPARING RH- AND/OR RU-CATALYST SUPPORTED ON MGO CARRIER AND REFORMING PROCESS USING THE CATALYST

(75) Inventors: Fuyuki Yagi; Atsuro Nagumo, both of Kawasaki; Yukitaka Wada; Mitsunori Shimura, both of Yokohama, all of (JP)

(73) Assignee: Chiyoda Corporation (JP)

( * ) Notice: Subject to any disclaimer, the term of this patent is extended or adjusted under 35 U.S.C. 154(b) by 0 days.

(21) Appl. No.: 09/825,966

(22) Filed: Apr. 5, 2001

(51) Int. Cl.⁷ .......................... B01J 23/58; B01J 31/00; B01J 21/18; C01B 31/18; C07C 1/02
(52) U.S. Cl. ...................... 502/328; 502/174; 502/183; 502/185; 502/328; 502/159; 423/418.2; 423/648.1; 423/650; 423/651; 252/373
(58) Field of Search ................... 502/174, 183, 502/185, 328, 159; 423/418.2, 648.1, 650, 651; 252/373

(56) References Cited

U.S. PATENT DOCUMENTS

| | | | |
|---|---|---|---|
| 3,222,132 A | 12/1965 | Dowden | 423/652 |
| 4,367,166 A | 1/1983 | Fujitani et al. | 423/652 |
| 4,415,484 A | 11/1983 | Setzer et al. | 423/651 |
| 4,621,071 A | * 11/1986 | Blanchard et al. | 502/302 |
| 5,246,791 A | 9/1993 | Fisher et al. | 429/16 |
| 5,395,406 A | 3/1995 | Clavenna et al. | 48/198.7 |
| 5,604,396 A | 2/1997 | Watanabe et al. | 313/485 |
| 5,614,163 A | 3/1997 | Bhattacharyya et al. | 423/418.2 |
| 5,919,425 A | 7/1999 | Nguyen et al. | 423/210 |
| 5,958,297 A | 9/1999 | Primdahl | 252/373 |
| 5,989,457 A | 11/1999 | Seshan et al. | 252/373 |
| 6,312,660 B1 | * 11/2001 | Yagi et al. | 423/652 |

FOREIGN PATENT DOCUMENTS

| | | |
|---|---|---|
| GB | 2182932 | 5/1987 |
| JP | 58-49602 | 3/1983 |
| JP | 60-202740 | 10/1985 |
| JP | 2-227141 | 9/1990 |
| JP | 2-307802 | 12/1990 |
| JP | 4-331704 | 11/1992 |
| JP | 9-131533 | 5/1997 |
| WO | 9424042 | 10/1994 |
| WO | 9616737 | 6/1996 |

OTHER PUBLICATIONS

Rostrup–Nielsen et al, CO2–Reforming of Methane over Transistion Metals, Journal of Catalysis 144, 38–49 Mar. 1993.

* cited by examiner

Primary Examiner—Mark L. Bell
Assistant Examiner—Patricia L. Hailey
(74) Attorney, Agent, or Firm—Lorusso & Loud

(57) ABSTRACT

A method of preparing a catalyst, including molding a mixture of magnesium oxide with a binder selected from carbon, fatty acids having 12–22 carbon atoms, magnesium salts of fatty acids having 12–22 carbon atoms, carboxymethyl cellulose, a magnesium salt of carboxymethyl cellulose and polyvinyl alcohol and calcining the molded mixture to obtain a carrier having a specific surface area of 5 m²/g of less. The carrier is impregnated with an aqueous solution containing Rh and/or Ru compounds for loading a catalytic metal component and then dried and calcined. The catalyst is used for reforming a lower hydrocarbon gas with steam and carbon dioxide or with carbon dioxide to produce a synthesis gas.

2 Claims, No Drawings

METHOD OF PREPARING RH- AND/OR RU- CATALYST SUPPORTED ON MGO CARRIER AND REFORMING PROCESS USING THE CATALYST

BACKGROUND OF THE INVENTION

This invention relates to a method of preparing a catalyst containing Rh and/or Ru supported on a MgO carrier and to a process of producing a synthesis gas.

A synthesis gas which is a mixed gas containing hydrogen and carbon monoxide is widely used as a raw material for the synthesis of ammonia, methanol, acetic acid, etc.

Such a synthesis gas may be produced by reforming a hydrocarbon with steam and/or carbon dioxide in the presence of a catalyst such as Ni or other transition metals. In the reforming reaction, however, carbon deposition occurs as a result of side reactions to cause a problem of catalyst poisoning.

EP-A-0974551 discloses a Rh and/or Ru-supporting MgO catalyst which can decrease carbon deposition. Because noble metals such as Rh and Ru are very expensive, there is a great demand for a method which can produce noble metal-containing catalyst using as small an amount of the noble metal as possible.

SUMMARY OF THE INVENTION

In accordance with one aspect of the present invention there is provided a method of preparing a catalyst, which includes mixing magnesium oxide with a binder selected from the group consisting of carbon, fatty acids having 12–22 carbon atoms, magnesium salts of fatty acids having 12–22 carbon atoms, carboxymethyl cellulose, a magnesium salt of carboxymethyl cellulose, and polyvinyl alcohol to obtain a mixture in which the binder is present in an amount of 0.1–5% by weight. The mixture is molded and calcined at a temperature of at least 1,000° C. to obtain a carrier having a specific surface area of 5 $m^2/g$ of less. The carrier is impregnated with an aqueous solution containing a catalytic metal component selected from the group consisting of rhodium compounds, ruthenium compounds and mixtures thereof so that the catalytic metal component is loaded on the carrier in an amount of 10–5,000 ppm, in terms of elemental metal, based on the weight of the carrier, and then dried and calcined to give a catalyst.

In another aspect, the present invention provides a process for the production of a synthesis gas, wherein a carbon-containing organic compound is reacted with steam and carbon dioxide at a temperature 600–1,000° C., a pressure of 5–40 Kg/cm² G and a GHSV of 1,000–10,000 $Hr^{-1}$ in the presence of a catalyst, obtained by the above method, with a molar ratio of the steam to carbon of the carbon-containing organic compound of 2 or less and a molar ratio of the steam to the carbon dioxide of 0.1–10.

The present invention further provides a process for the production of carbon monoxide, wherein a carbon-containing organic compound is reacted with carbon dioxide at a temperature 600–1,000° C., a pressure of 5–40 Kg/cm²G and a GHSV of 1,000–10,000 $Hr^{-1}$ in the presence of a catalyst, obtained by the above method, with a molar ratio of the carbon dioxide to carbon of the carbon-containing organic compound of 1.0–3.0 to obtain a synthesis gas, and wherein the synthesis gas is treated to concentrate carbon monoxide.

DETAILED DESCRIPTION OF THE PREFERRED EMBODIMENTS OF THE INVENTION

In the method of the present invention, a carrier of MgO (magnesium oxide) having a specific surface area (SA) of 5 $m^2/g$ or less is used. Thus, in the first step, magnesium oxide is mixed uniformly with a binder selected from carbon, fatty acids having 12–22 carbon atoms, magnesium salts of fatty acids having 12–22 carbon atoms, carboxymethyl cellulose, a magnesium salt of carboxymethyl cellulose, and polyvinyl alcohol to obtain a mixture. The binder serves as a molding aid for molding magnesium oxide into a desired shape and as a lubricant which can facilitate the molding operation because of easiness in filling or charging the mixture to a molding device. The use of carbon as the binder is preferred for reasons of its availability at low costs. The carbon may be, for example, graphite, carbon black or activated carbon. Examples of the fatty acids include lauric acid, myristic acid, palmitic acid, stearic acid and behenic acid.

Each of the magnesium oxide and binder is preferably in the form of powder having an average particle diameter of 1–1,000 μm, more preferably 10–100 μm. The binder is used in an amount of 0.1–5% by weight, preferably 2–4% by weight, based on the total weight of the magnesium oxide and the binder, namely the mixture. When the amount of the binder is smaller than 0.1% by weight, a molded product obtained by molding the mixture as described hereinafter and a carrier obtained by calcining the molded product as described hereinafter fail to show satisfactory mechanical strengths. Additionally, such a small amount of the binder cannot improve easiness in filling or charging the mixture to a molding device. Too large an amount of the binder in excess of 5% by weight is undesirable because the binder retains in the carrier after calcination, causing reduction of mechanical strengths of the carrier. The use of an excess amount of the binder is also disadvantageous from the standpoint of economy.

The mixture is then molded into a molding device. The molding operation is generally performed at a room temperature and a pressure of 100–3,000 kg/cm²G, preferably 200–2,000 kg/cm²G, using any suitable molding method such as a press molding method or a tablet making method, to produce a molded product having any desired shape such as in the form of tablet, rod, ring or cylinder. The molded product generally has a size (diameter or longitudinal length) of 3–30 mm, preferably, 5–25 mm. The shape and the size of the molded product are suitably determined in view of the kind of catalyst bed used.

The molded product is then calcined at a temperature of at least 1,000° C., preferably 1,100–1,300° C., to obtain a carrier having a specific surface area of 5 $m^2/g$ of less. Upper limit of the calcination temperature is generally 1,500° C. Magnesium oxide having a large specific surface area may be used as a raw material in the present invention, because sintering of magnesium oxide proceeds significantly during the calcination at 1,000° C. or more so that the specific surface area of the magnesium oxide carrier obtained can be reduced to 5 $m^2/g$ of less. The calcination is carried out in an oxygen-containing atmosphere, generally air, for at least 1 hour, preferably at least 3 hours. The upper limit of the calcination time is not specifically limited, but is generally about 72 hours. During the course of the calcination, the binder contained in the molded product is decomposed and disappears. The carrier thus obtained has high mechanical strengths of, for example, a side crashing strength of 30–70 kg/piece.

The thus obtained MgO carrier having a specific surface area of 5 $m^2/g$ or less has a high degree of crystallinity and has stable surfaces having reduced strong acid sites. Namely, the MgO thus stabilized has a Hammett acidity function (Ho) of 2 or more and has an amount of the acid sites of not greater than 0.03 mmol/g.

When the specific surface area of the MgO carrier is greater than 5 m²/g, the degree of crystallinity becomes low and the amount of catalytic metal (Rh or Ru) supported thereon is unavoidably increased. Additionally, the acid strength is so increased that the resulting catalyst may cause undesirable reactions resulting in deposition of carbon on the catalyst. When the specific surface area of the MgO carrier is extremely low, the amount of the catalytic metal supported thereon is very small. At least 0.01 m²/g is desirable to obtain satisfactory catalytic activity. Preferably, the specific surface area of the MgO carrier is 0.05–3 m²/g.

The term "specific surface area" referred to in the present specification in connection with catalyst or MgO carrier is measured by the "BET method" at a temperature of 15° C. using a measuring device "SA-100" manufactured by Shibata Science Inc.

The catalytic metal which is at least one of Rh and Ru may be loaded on the MgO carrier by any known method such as impregnation by spraying or immersion or ion exchange using an aqueous solution containing a water soluble compound, such as halide, nitrate, sulfate, organic acid salt (e.g. acetate) or complex (chelate compound) of rhodium and/or ruthenium.

The amount of the catalytic metal (Rh and/or Ru) loaded on the MgO carrier is 10–5,000 ppm, preferably 100–2,000 ppm, in terms of elemental metal, based on the weight of the MgO carrier. An amount of the catalytic metal above 5,000 ppm is undesirable because the costs of the catalyst increase and because carbon deposition occurs. Too small an amount of the catalytic metal below 10 ppm fails to provide satisfactory catalytic activity. The amount of the catalytic metal may be controlled by control of the specific surface area of the MgO carrier or by control of the conditions under which the catalytic metal is loaded on the MgO carrier, such as concentration of the catalytic metal compound in the aqueous solution.

The MgO carrier to which the catalytic metal has been loaded is then dried at any suitable temperature, preferably 30–150° C. The dried carrier is subsequently calcined at a temperature of preferably at least 200° C. for at least 1 hour. The upper limit of the calcination temperature is not specifically limited but is generally about 1,100° C. The calcination temperature is preferably at least 2 hours, more preferably at least 3 hours. The upper limit of the calcination time is not specifically limited but is generally about 24 hours. As a consequence of the calcination, the catalytic metal has improved thermal stability and, hence, the catalyst has excellent thermal stability.

The thus obtained catalyst has an amount of the catalytic metal of 10–5,000 ppm, preferably 100–2,000 ppm, based on the weight of the MgO carrier and a specific surface area of 0.01–5 m²/g, preferably 0.05–3 m²/g. Because the catalytic metal is prevented from aggregating but is in the form of fine particles uniformly dispersed on the MgO carrier having a high crystallinity and a small surface area, the catalyst exhibits satisfactory reforming activity while preventing carbon deposition, even though the amount of the catalytic metal is very small.

The thus obtained catalyst also has a Hammett acidity function (Ho) of more than 2, preferably at least 3.3 and has an amount of the acid sites of not greater than 0.03 mmol/g, preferably not grater than 0.02 mmol/g and, thus, the carbon deposition activity thereof is highly suppressed. The Ho value of the catalyst may be controlled by the calcination temperature and time of the molded MgO for the preparation of the MgO carrier.

The Hammett acidity function Ho is defined as the ability of the solid surface to convert an adsorbed alkaline base B⁻ into its acid form B⁻H⁺ and is represented by the following formula:

$$Ho = pKa \ (=pK_{B^-H^+}) + \log[B]/[B^-H^+]$$

wherein $K_{B^-H^+}$ represents a dissociation constant of the acid form B⁻H⁺ formed by a reaction between the basic indicator B⁻ and the acidic site H⁺B, and [B]/[B⁻H⁺] is a ratio of the concentration of the indicator present in the medium as a neutral base B to the concentration present as the acid form H⁺B. Stronger the acid site, the more is the tendency of the catalyst to transfer proton to the indicator and, therefore, Ho becomes smaller.

The Hammett acidity function Ho in the present specification is measured by "Benesi method" disclosed in Handbook for Catalyst Experiments, p. 172, Kodansha Scientific, 1986. Discoloration of an indicator, whose pKa is known, upon being contacted with a catalyst indicates that the catalyst contains acid points whose Ho is smaller than the pKa of the indicator. Various predetermined amounts of butylamine which is a base are adsorbed on the acid points and titration is then performed using different indicators having different pKa. From the amount of the butylamine, the amount of the acid points can be determined. From the pKa values, the Ho value can be determined. Measurement is performed at room temperature.

The production of a synthesis gas may be performed by reacting a hydrocarbon feed with steam and/or carbon dioxide ($CO_2$) in the presence of a catalyst prepared by the above-described method. As the hydrocarbon feed, a lower hydrocarbon such as methane, ethane, propane, butane or naphtha may be used. The use of methane is preferred. In the present invention, a natural gas (methane gas) containing carbon dioxide is advantageously used.

In the case of a method of reacting methane with carbon dioxide ($CO_2$) (reforming with $CO_2$), the reaction is as follows:

$$CH_4 + CO_2 \rightleftharpoons 2H_2 + 2CO \qquad (1)$$

In the case of a method of reacting methane with steam (reforming with steam), the reaction is as follows:

$$CH_4 + H_2O \rightleftharpoons 3H_2 + CO \qquad (2)$$

In the reforming with $CO_2$, the reaction temperature is 500–1,200° C., preferably 600–1,000° C. and the reaction pressure is an elevated pressure of 5–40 kg/cm²G, preferably 5–30 kg/cm²G. When the reaction is performed with a fixed bed system, the gas space velocity (GHSV) is 1,000–10,000 hr⁻¹, preferably 2,000–8,000 hr⁻¹. The amount of $CO_2$ relative to the hydrocarbon feed is 20-0.5 mole, preferably 10–1 mole, per mole of carbon of the raw material compound.

In the reforming with steam, the reaction temperature is 600–1,200° C., preferably 600–1,000° C. and the reaction pressure is an elevated pressure of 5–40 kg/cm²G, preferably 5–30 kg/cm²G. When the reaction is performed with a fixed bed system, the gas space velocity (GHSV) is 1,000–10,000 hr⁻¹, preferably 2,000–8,000 hr⁻¹. The amount of steam relative to the hydrocarbon feed is 0.5–5 moles, preferably 1–2 moles, more preferably 1–1.5 moles, per mole of carbon of the raw material compound.

In the reforming with steam according to the present invention, it is possible to produce a synthesis gas in an industrially favorable manner while suppressing the carbon deposition, even when the amount of steam ($H_2O$) is maintained 2 moles or less per mole of carbon of the hydrocarbon feed. In view of the fact that 2–5 moles of steam ratio is required in the conventional method, the present invention, which can permit the reforming reaction to smoothly proceed with an amount of steam of 2 moles or less, has a great industrial merit.

In a case where a synthesis gas is produced in the present invention by reacting a hydrocarbon feed with a mixture of steam and $CO_2$, the mixing proportion of steam and $CO_2$ is not specifically limited but is generally such as to provide a $H_2O/CO_2$ molar ratio of 0.1–10.

A process for the production of carbon monoxide includes, as a first step, a synthesis gas producing step. The first step is carried out by reacting a carbon-containing organic compound with carbon dioxide in the presence of a catalyst prepared by the method according to the present invention. In the reaction of the carbon-containing organic compound with carbon dioxide (reforming with $CO_2$), the reaction temperature is 500–1,200° C., preferably 600–1,000° C. and the reaction pressure is an elevated pressure of 5–40 kg/cm$^2$G, preferably 5–30 kg/cm$^2$G. When the reaction is performed with a fixed bed system, the gas space velocity (GHSV) is 1,000–10,000 hr$^{-1}$, preferably 2,000–8,000 hr$^{-1}$. The amount of carbon dioxide relative to the raw material carbon-containing organic compound is 1–10 moles, preferably 1–5 moles, more preferably 1–3 moles, per mole of carbon of the raw material compound.

In the reforming with $CO_2$ according to the present invention, a synthesis gas can be produced in an industrially advantageous manner while preventing carbon deposition, even when the amount of $CO_2$ is maintained no more than 3 moles per mole of carbon of the raw material compound.

As a result of the above-described reforming with $CO_2$, a synthesis gas containing hydrogen and carbon monoxide is obtained. When methane is used as a raw material, the synthesis gas has, for example, a composition containing 10–30 vol % of $H_2$, 35–45 vol % of CO, 5–40 vol % of unreacted $CO_2$, 0–30 vol % of unreacted $CH_4$ and 5–20 vol % of $H_2O$.

In the second step, the thus obtained synthesis gas is used as a raw material and carbon monoxide (CO) is concentrated therefrom. The CO concentration may be carried out by a customarily employed CO concentration method such as a cryogenic separation and a absorption method using an aqueous copper salt solution as an absorbent.

The above processes may be carried out with various catalyst systems such as a fixed (packed) bed system, a fluidized bed system, a suspension bed system and a moving bed system. The fixed bed system is preferably used.

The following examples will further illustrate the present invention. Parts and percentages are by weight.

EXAMPLE 1

97 Parts of commercially available MgO powder (purity: 98.7% or more) were mixed with 3 parts of carbon powder and the mixture was subjected to tablet making to obtain pellets having ⅛ inch size. The pellets were calcined at 1,060° C. for 3 hours in air to obtain a MgO carrier I. MgO carrier I was then immersed in an aqueous solution containing 3.9%, in terms of Rh metal, of rhodium acetate so that Rh was adsorbed on the carrier. This was filtered to obtain Rh-loaded MgO carrier I. The amount of Rh loaded on the MgO carrier I was 3,750 ppm, in terms of elemental Rh, based on the weight of the MgO carrier I. The Rh-loaded MgO carrier I was then dried in air at 35° C. for 52 hours and calcined at 850° C. for 3 hours in air, thereby obtaining a catalyst I having a Rh content of 3,750 ppm, in terms of elemental Rh, based on the MgO carrier I and a specific surface area of 1.2 m$^2$/g. Acid sites of catalyst I had an acid strength (Ho) of 3.3 or more and were present in an amount of 0.01 mmol/g.

EXAMPLE 2

97.5 Parts of commercially available MgO powder (purity: 98.7% or more) were mixed with 2.5 parts of carbon powder and the mixture was subjected to tablet making to obtain pellets having ⅛ inch size. The pellets were calcined at 1,100° C. for 3 hours in air to obtain a MgO carrier II. MgO carrier II was then immersed in an aqueous solution containing 0.5%, in terms of Ru metal, of ruthenium (III) chloride so that Ru was adsorbed on the carrier. This was filtered to obtain Ru-loaded MgO carrier II. The amount of Rh loaded on the MgO carrier II was 75 ppm, in terms of elemental Ru, based on the weight of the MgO carrier II. The Ru-loaded MgO carrier II was then dried in air at 60° C. for 72 hours and calcined at 800° C. for 2.5 hours in air, thereby obtaining a catalyst II having a Ru content of 75 ppm, in terms of elemental Ru, based on the MgO carrier II and a specific surface area of 0.6 m$^2$/g. Acid sites of catalyst I had an acid strength (Ho) of 3.3 or more and were present in an amount of 0.008 mmol/g.

EXAMPLE 3

97.5 Parts of commercially available MgO powder (purity: 99.9%) were mixed with 2.5 parts of magnesium stearate and the mixture was molded to obtain pellets having ⅛ inch size. The pellets were calcined at 1,200° C. for 2.5 hours in air to obtain a MgO carrier III. MgO carrier III was then immersed in an aqueous solution containing 2.6%, in terms of Rh metal, of rhodium acetate so that Rh was adsorbed on the carrier. This was filtered to obtain Rh-loaded MgO carrier III. The amount of Rh loaded on the MgO carrier I was 1,750 ppm, in terms of elemental Rh, based on the weight of the MgO carrier III. The Rh-loaded MgO carrier III was then dried in air at 100° C. for 34 hours and calcined at 950° C. for 3.5 hours in air, thereby obtaining a catalyst III having a Rh content of 1,750 ppm, in terms of elemental Rh, a specific surface area of 0.2 m$^2$/g. Acid sites of catalyst I had an acid strength (Ho) of 3.3 or more and were present in an amount of 0.002 mmol/g.

Reaction Example 1

The catalyst I (30 cc) obtained in Example 1 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:0.4$ and a molar ratio of $CH_4:H_2O=1:0.85$ was then treated at a temperature of 820° C. and a pressure of 20 kg/cm$^2$G and with GHSV (methane basis) of 4,000 hr$^{-1}$. The $CH_4$ conversion at 5 h after the commencement of the reaction was 50% (equilibrium $CH_4$ conversion under the experimental condition=50%), and the $CH_4$ conversion at 1,200 h after the commencement of the reaction was 50%. The term "$CH_4$ conversion" herein is defined by the following formula:

$$CH_4 \text{ Conversion } (\%) = (A-B)/A \times 100$$

A: mole number of $CH_4$ in the raw material
B: mole number of $CH_4$ in the product.

Reaction Example 2

The catalyst II (30 cc) obtained in Example 2 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:1$ was then treated at a temperature of 850° C. and a pressure of 20 kg/cm²G and with GHSV (methane basis) of 6,000 hr⁻¹. The $CH_4$ conversion at 5 h after the commencement of the reaction was 55% (equilibrium $CH_4$ conversion under the experimental condition=55%), and the $CH_4$ conversion at 860 h after the commencement of the reaction was 54%.

Reaction Example 3

The catalyst III (30 cc) obtained in Example 3 was packed in a reactor to perform a test of reforming methane with $CO_2$.

The catalyst was previously subjected to a reduction treatment at 900° C. for 1 h in a $H_2$ stream. A raw material gas having a molar ratio of $CH_4:CO_2=1:1$ was then treated at a temperature of 840° C. and a pressure of 20 kg/cm²G and with GHSV (methane basis) of 3,500 hr⁻¹. The $CH_4$ conversion at 5 h after the commencement of the reaction was 53% (equilibrium $CH_4$ conversion under the experimental condition=53%), and the $CH_4$ conversion at 250 h after the commencement of the reaction was 53%.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H10-278243, filed Sep. 30, 1998, inclusive of the specification and claims, are hereby incorporated by reference herein.

What is claimed is:

1. A method of preparing a catalyst, comprising the steps of:

mixing magnesium oxide with a binder selected from the group consisting of carbon, fatty acids having 12–22 carbon atoms, magnesium salts of fatty acids having 12–22 carbon atoms, carboxymethyl cellulose, a magnesium salt of carboxymethyl cellulose, and polyvinyl alcohol to obtain a mixture in which said binder is present in an amount of 0.1–5% by weight based on the total weight of said mixture;

molding said mixture;

calcining said molded mixture at a temperature of at least 1,000° C. to obtain a carrier having a specific surface area of 5 m²/g of less;

impregnating said carrier with an aqueous solution containing a catalytic metal component selected from the group consisting of rhodium compounds, ruthenium compounds and mixtures thereof so that the catalytic metal component is loaded on said carrier in an amount of 10–5,000 ppm, in terms of elemental metal, based on the weight of said carrier;

drying and calcining said catalytic metal component-loaded carrier.

2. A method as claimed in claim 1, wherein said binder is carbon.

* * * * *